(12) United States Patent
Chen et al.

(10) Patent No.: US 7,338,624 B2
(45) Date of Patent: Mar. 4, 2008

(54) CERAMIC MANUFACTURE FOR A COMPOSITE ION TRANSPORT MEMBRANE

(75) Inventors: Hancun Chen, Williamsville, NY (US); Jack C. Chen, Getzville, NY (US); Weitung Wang, East Amherst, NY (US)

(73) Assignee: Praxair Technology Inc., Danbury, CT (US)

( * ) Notice: Subject to any disclaimer, the term of this patent is extended or adjusted under 35 U.S.C. 154(b) by 212 days.

(21) Appl. No.: 10/208,052

(22) Filed: Jul. 31, 2002

(65) Prior Publication Data

US 2004/0021240 A1   Feb. 5, 2004

(51) Int. Cl.
B29C 44/04 (2006.01)
(52) U.S. Cl. .................... 264/45.1; 264/46.4; 264/301; 264/308; 264/345
(58) Field of Classification Search ................. 264/301, 264/264, 46.4, 45.1, 308, 345
See application file for complete search history.

(56) References Cited

U.S. PATENT DOCUMENTS

| | | | | |
|---|---|---|---|---|
| 4,883,497 A | * | 11/1989 | Claar et al. ................. 29/623.5 |
| 4,957,673 A | | 9/1990 | Schroeder et al. ............. 264/60 |
| 4,971,696 A | | 11/1990 | Abe et al. .............. 210/500.25 |
| 5,091,346 A | * | 2/1992 | Inoue et al. .................... 501/93 |
| 5,160,618 A | * | 11/1992 | Burggraaf et al. .......... 210/490 |
| 5,240,480 A | | 8/1993 | Thorogood et al. .............. 96/4 |
| 5,308,422 A | * | 5/1994 | Askay et al. ............. 156/89.28 |
| 5,534,471 A | * | 7/1996 | Carolan et al. ................. 502/4 |
| 5,879,828 A | * | 3/1999 | Debe et al. .................... 429/41 |
| 6,287,716 B1 | | 9/2001 | Hashimoto et al. ........... 429/33 |
| 6,299,778 B1 | * | 10/2001 | Penth et al. ................. 210/650 |
| 6,306,515 B1 | | 10/2001 | Goedjen et al. ............ 428/469 |
| 6,368,383 B1 | * | 4/2002 | Virkar et al. ................... 95/54 |
| 6,514,314 B2 | * | 2/2003 | Sirman et al. ................. 95/54 |
| 6,772,501 B2 | * | 8/2004 | Armstrong et al. ........ 29/592.1 |

FOREIGN PATENT DOCUMENTS

WO        0224997        3/2002

* cited by examiner

*Primary Examiner*—Monia A Huson
(74) *Attorney, Agent, or Firm*—David M. Rosenblum

(57) ABSTRACT

A method of producing a green form for use in manufacturing a composite, ceramic ion transport membrane is provided in which first and second ceramic powder mixtures are used to produce first and second layers of the green form. The first and second ceramic powder mixtures have ceramic particles and a pore former. After formation of each of the first and second layers or after formation of the second layer, heat is applied to burn out the binder and form pores. This heating is completed prior to application of a dense layer to prevent production of defects within the dense layer. The dense layer contains an ion transport material. Defects are also prevented by grading particle size from the first layer to the dense layer. This allows the second intermediate layer to fill in larger pores of the first layer and to present a smooth surface to the dense layer. Additionally, the second ceramic powder mixture contains in part material used in forming the dense layer for thermal expansion compatibility purposes.

7 Claims, 2 Drawing Sheets

CERAMIC MANUFACTURE FOR A COMPOSITE ION TRANSPORT MEMBRANE

STATEMENT REGARDING FEDERALLY SPONSORED RESEARCH OR DEVELOPMENT

This invention was made with the United States government support under MST ATP Award No. 70NANB0H3052 awarded by the National Institute of Standards and Technology (NIST). The United States government has certain rights in the invention.

FIELD OF THE INVENTION

The present invention relates to a method of producing a green form that is useful in manufacturing a composite ion transport membrane. More particularly, the present invention relates to such a green form in which pores are produced within a first layer and one or more second intermediate layers prior to application of a dense layer and the pores and particles used in forming second intermediate layers are smaller than those of the first layer to prevent pinhole defects from forming within the dense layer.

BACKGROUND OF THE INVENTION

Ceramic ion transport membranes are ceramic devices in the form of tubes, flat plates or honeycomb structures that are capable of oxygen ion transport or proton transport at elevated temperatures. Membranes may be formed from materials that are either mixed conductors that conduct both ions and electrons or ionic conductors that conduct ions only. Mixed conducting materials are used in various reactors that involve oxygen or hydrogen separation from a feed. Ionic conductors are also used in oxygen separation devices and in addition, solid oxide fuel cells designed to produce electrical power.

For instance, in case of mixed conductors that are used in forming oxygen transport membranes, oxygen ionizes at a cathode surface of the membrane to form oxygen ions. The oxygen ions are transported through the membrane where they emerge from an opposite, anode side to recombine into elemental oxygen. In such recombination, electrons are given up to the membrane and are transported to the opposite cathode side where they serve to ionize the oxygen. Such a membrane can be used in an oxygen generator and also, a chemical reactor designed, for example, to produce synthesis gases.

In ceramic membranes that are formed from ionic conductors, since the membrane is only capable of transporting the ions, an external circuit or conductive phase is provided for transport of the electrons. An external circuit is used in oxygen generators to apply an electric current across the membrane. In solid oxide fuel cells, the external circuit is used to conduct the electrons to a load. Conductive phases are used when the membrane is to serve in a pressure driven application.

It has long been recognized in the art that an ion transport membrane should be as thin as possible to minimize the internal resistance to the ionic transport. Thus, ion transport membrane are constructed as composite structures having a very thin dense layer, that is a layer that is air tight, formed from a material capable of conducting the ions and that is supported by one or more porous layers. The porous support layers can be inert or active and in fact, can be formed of the same material as the dense layer. The porosity allows for the separated oxygen to freely permeate through the support. At the same time, in case of active supports, there exists more area in which oxygen ions can recombine combine to form elemental oxygen and to give up electrons.

An example of a membrane incorporating a mixed conducting dense layer can be found in U.S. Pat. No. 5,240,480 in which a dense layer of a mixed conducting oxide is supported by one or more porous layers. Where multiple porous layers are used, the thickness of the layers and the pore size thereof successively increases from layer to layer.

U.S. Pat. No. 4,957,673 discloses a multilayer ceramic oxide structure for use in fuel cells or electrolysis cells in which layers of strontium lanthanum manganite sandwich a layer of yttria stabilized zirconia. The yttria stabilized zirconia is an ionic conductor to act as the electrolyte and the strontium lanthanum manganite serves as electrodes.

There are a variety of different ways of forming a composite ion transport membrane. For instance, the dense layer can be applied to a porous substrate by tape casting. Another common method is to tape cast layers of the composite. In this regard, in U.S. Pat. No. 4,957,673, discussed above, a composite tape is made having electrolyte and conductor layers that is pressed to laminate the layers together and then fired to form the finished article. A yet further method is to isopress ceramic powder mixtures, some of which contain pore formers such as disclosed in WO0224997 or to isopress a combination of tape cast film and ceramic powders containing pore formers such as disclosed in WO0224437. The green form resulting from tape casting or isopressing is heated to burn off the binder and any pore forming material. The heating is continued until the ceramic sinters to produce the finished article.

The problem with such methods of forming the green article is that it becomes difficult to form a thin dense layer that is free of defects. It has been found that the green form, as hereinabove described, will produce an unacceptable level of pinhole defects within the dense layer due to the evolution of gases produced during the burnout of the binder and pore forming material. Such defects are especially exacerbated in supports that have a large pore size. Thus, while it is possible to form a dense layer, such dense layer if too thin will have an unacceptable level of defects. If the dense layer is made sufficiently thick to reduce the occurrence of defects, its resistance to ionic transport will increase to unacceptable levels.

As will be discussed, the present invention provides a method of manufacturing a green form that is useful in producing a composite, ceramic ion transport membrane in which the degree of pinhole defects within the dense layer is reduced over the prior art to enable composite structures to be produced having a very low resistance to ionic transport.

SUMMARY OF THE INVENTION

The present invention provides a method of producing a green form for use in manufacturing a composite, ceramic ion transport membrane. In accordance with the method, a first layer is formed from a first ceramic powder mixture. At least one second intermediate layer is formed on the first layer from at least one second ceramic powder mixture. The at least one second intermediate layer is thinner than the first layer. The first ceramic powder mixture and the at least one second ceramic powder mixture have a binder and at least the first ceramic powder mixture also has a pore forming material. The at least one second ceramic powder mixture is formed at least in part by material used in forming a dense layer and has a particle size less than that of particles of said first ceramic powder mixture to decrease surface roughness and to allow formation of pores of smaller size than those of the first layer. The first and the at least one second intermediate layer are heated to remove the binder and pore forming material and to form the pores while not sintering the first and the at least one second intermediate layer. The dense layer is formed on said at least one second intermediate layer after the removal of the binder and the formation of the pores. The material of the dense layer is capable of conducting ions.

By forming the pores prior to applying the dense layer, when the resulting green form is fired, no gases are evolved from decomposition of the pore formers and binder that would form pinhole defects within the adjacent dense layer. Another feature of the present invention, that acts to prevent defects within the dense layer, is that the at least one second intermediate layer presents smaller pores to the dense layer than those of the first layer. The reason for this is that the particle size of the at least one second intermediate layer is less than that of the first layer. The smaller particle size decreases surface roughness of the surface of the first layer that would otherwise be presented to the dense layer and to allow formation of smaller size pores to also prevent defects in the dense layer. In case of multiple second intermediate layers the particle size and pore size would be graded. A further advantageous feature of the present invention is that the second ceramic mixture is formed in part from the material used in forming the dense layer to help provide a transition of material make-up between the first layer and the dense layer to help enhance the thermal expansion compatibility between layers. The at least one second intermediate layer is thinner than the first layer to help prevent separation of the layers due to any thermal expansion incompatibility that exists between layers.

The first layer and at least one second intermediate layer can be heated separately or they can be heated together. The at least one second intermediate layer can be formed on the first layer by dip coating and the dense layer can be formed on the at least one second intermediate layer by dip coating. Alternatively the at least one second intermediate layer can be formed by tape iso-pressing. Another alternative is to form the dense layer on the second intermediate layer by thermal spraying.

The green form can be used in the manufacturer of an electrolytic cell in which the first layer forms the anode and the dense layer forms the electrolyte thereof. As such, the dense layer is an ionic conductor.

Preferably, in case of an electrolytic cell, after heating, the pores of said first layer are in a large size range of between about 20 microns and about 100 microns and a small size range of between about 1 micron and about 10 microns. It is to be noted that the term "pore size" as used herein and in the claims means the pore size determined through mercury porosimetry. A porosity is produced by such pores of between about 20 percent and about 45 percent. The at least one second intermediate layer can be a single second intermediate layer formed from a single ceramic powder mixture. In such case, the second intermediate layer can have pores no greater than 5 microns and a porosity of no greater than about 45 percent. The first ceramic powder can be a mixture of coarse and fine particles. In such case the coarse particles have a coarse particle size range of between about 30 microns and about 150 microns and the fine particles have a fine particle size of no greater than 15 microns. The single second ceramic powder can be provided with particles having a second particle size in a second particle size range of between about 0.1 microns and about 5 microns. Preferably, a ratio of particle sizes between those of the single second intermediate layer and the dense electrolyte layer is between about 1.2 and about 10.

The first ceramic powder mixture can comprise between about 10 percent and about 90 percent gadolinium doped ceria (hereinafter referred to in the specification and claims as "CGO") and the remainder strontium doped lanthanum cobalt iron oxide (hereinafter referred to in the specification and claims as "LSCF"). The electrolyte can be formed of CGO and the second ceramic powder mixture can comprise LSCF and CGO. In the second ceramic powder mixture there is more CGO than that of the first ceramic powder mixture and less LSCF than the first ceramic powder mixture.

In case of an electrolytic cell, the ceramic form can be of tubular configuration and the first layer can have a first layer wall thickness of between about 0.5 mm and about 3.5 mm. The single second intermediate layer can have a second intermediate layer wall thickness of no greater than about 30 microns. The electrolyte can have an electrolyte layer thickness of between about 10 microns and about 100 microns.

BRIEF DESCRIPTION OF THE DRAWINGS

While the specification concludes with claims distinctly pointing out the subject matter that Applicants regard as their invention, it is believed that the invention would be better understood when taken in connection with the accompanying drawings in which:

DETAILED DESCRIPTION

The present invention provides a method of producing a green ceramic form that is useful in manufacturing a composite, ceramic ion transport membrane. In this regard, the ceramic ion transport membrane can be mixed conducting, that is, it conducts both oxygen ions or protons and electrons or can be an ionic conductor and thus, conducts ions only.

Figure 1:
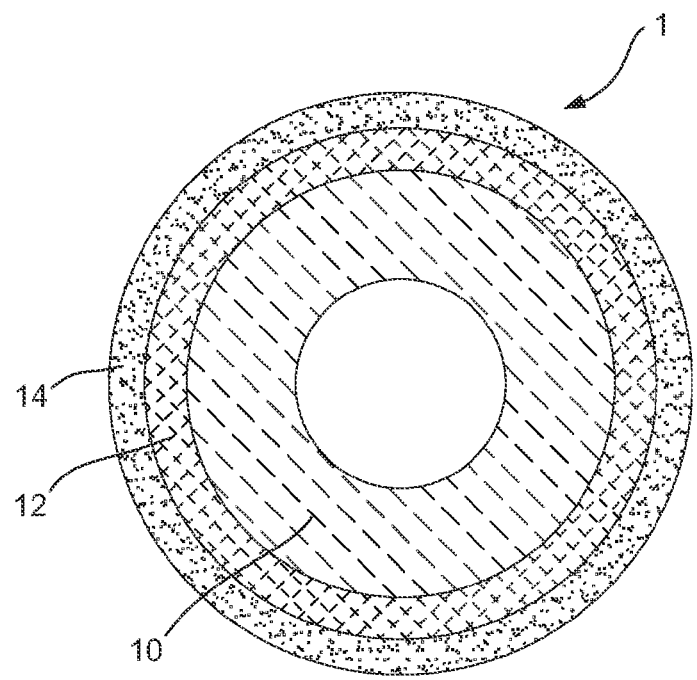
FIG. 1 is a cross-sectional schematic view of a green form in accordance with the present invention.

With reference to FIG. 1, although the present invention has wide applicability, it will be discussed with reference to a preferred green form 1 that is used in the manufacture of an electrolytic cell to be incorporated in an electrically driven oxygen generator. Green form 1 has a first layer 10 that serves as an anode, a second intermediate layer 12, and a dense electrolyte layer 14 that acts as an electrolyte. In the illustration, green form 1 is of tubular configuration. The present invention, however, has application to any type of configuration, for instance, a tube, flat plate, or honeycomb.

First layer 10 is designed to serve as an anode for the electrolytic cell. It is formed of a first ceramic powder mixture that can in part be formed from a mixed conducting metal oxide having a perovskite structure such as LSCF. In order to increase the mechanical strength of first layer 10 and reduce thermal stress arising from thermal mismatch between first layer 10 and dense electrolyte layer 14, the first ceramic powder mixture of first layer 10 can also include the material of the dense electrolyte layer 14, preferably, CGO.

The CGO content can be anywhere from about 10% and about 90% by weight. The first ceramic powder mixture also contains an organic binder and a pore forming material such as starch, sawdust, graphite and etc.

In order to reduce the gas diffusion resistance while maintaining a high mechanical strength, the first ceramic powder mixture can be designed to impart within first layer 10, a non-uniform pore size distribution. The non-uniform pore size distribution preferably includes larger pores in a large pore size range of between about 20 microns and about 100 microns and smaller pores in a small pore size range of between about 1 and about 10 microns. The porosity of first layer 10 is preferably in a range from between about 20% and about 45%.

The foregoing structure can be made by either including two different size pore formers within the first ceramic powder mixture or by providing the first ceramic powder mixture with both coarse and fine ceramic particles. Typically, the first ceramic powder mixture can contain anywhere from between about 20% and about 40% by weight of the coarse ceramic particles with particle sizes ranging from between about 30 microns and about 150 microns. The fine ceramic particles content can be anywhere from between about 60% and about 80% by weight and have a particle size of no more than 15 microns. Approximately 15% by weight of the first ceramic powder mixture can consist of a graphite pore former having a particle size of less than about 300 microns, preferably less than about 150 microns.

The first ceramic powder mixture can be molded into a green tube to form the first layer 10 using any method. The thickness of first layer can be anywhere from about 0.5 mm to about 3.5 mm. Such method can be used in combination with the formation of the second intermediate layer 12, such as described in connection with WO0224437. A preferred method is to form first layer 10 by isopressing the first ceramic powder mixture into a green tube. After formation of the green tube, the green tube is heated to remove the binder and pore forming material without sintering the ceramic content thereof. Thereafter, one or more second intermediate layers 12 are formed by dip coating the heat treated green tube forming the first layer 10. If the first layer 10 and the second intermediate layer 12 are formed concurrently, the resultant structure can be heated to remove binder and form pores in both the first layer 10 and the second intermediate layer 12.

Second intermediate layer 12 can be formed of a second ceramic powder mixture that, as in the first ceramic powder mixture, contains CGO and electron conducting oxide such as LSCF. Additionally, a binder is included and depending upon the method of formation, a pore forming material may be included. In case of formation by dip coating the green form of first layer 10, a pore former would not necessarily be present. Upon heating and removal of the binder, pores will form in such layer without any pore former.

The exact material mix of the second ceramic powder mixture is selected to prevent thermal expansion incompatibility between the first layer 10 and the dense electrolyte layer 14. For example, if first layer 10 contains about 50% LSCF by weight, remainder CGO, the second intermediate layer would consist of a mixture of about 30% LSCF by weight and about 70% by weight of CGO.

A primary role of the second intermediate layer 12 is to reduce surface roughness of the first layer 10. Under fixed coating conditions, the density or lack of voids in a subsequent dense electrolyte layer 14 will be dependent upon the smoothness of the surface being coated to form a dense electrolyte layer 14. Second intermediate layer 12 must also provide sufficient porosity to allow for gas diffusion of the separated gas from the dense electrolyte layer 14 to first layer 10. Additionally, second intermediate layer 12 also reduces the size of large pores in first layer 10 to also help in the reduction of pinhole defects in dense electrolyte layer 14. The porosity and pore size distribution of the second intermediate layer 12 needs to be well controlled to create the required smooth surface on first layer 10 for the deposition of the dense electrolyte layer 14. In this regard, with the preferred first layer 10 described above, the second ceramic powder mixture should be designed to produce pores of no greater than about 5 microns and a porosity of no greater than about 45%. The second ceramic powder mixture for such purposes incorporates ceramic particles having of between about 0.1 microns and about 5 microns.

As indicated above, second intermediate layer 12 can be formed on first layer 10 after molding or other forming technique and after removal of binder and pore forming material by dip coating. Preferably, the heat treated green form of first layer 10 is dipped into a slurry solution containing the second ceramic powder mixture at atmospheric pressure or under a driving force by use of a vacuum pump to create a pressure differential from the coated surface to the opposite surface of first layer 10. The resultant second intermediate layer 12 is then dried before further processing. More than one of the second intermediate layer 12 could be formed by repeated dipping in slurry solutions having successively smaller ceramic particles. Preferably, the thickness of the second intermediate layer 12 is no more than about 15 microns.

The second intermediate layer 12 is heated to burn out the binder and to form pores in the second intermediate layer 12 without sintering the ceramic content of either of the layers. In case of concurrent formation, again, such heat treatment can be applied to the resultant green form.

The dense electrolyte layer 14 can be applied to the second intermediate layer 12 by methods that include thermal spraying, slurry dip or colloidal processing or tape iso-pressing. The dense electrolyte layer 14 can be formed of CGO. Other known ionic conductors can be used such as yttria stabilized zirconia and scandia stabilized zirconia. The thickness of the electrolyte layer should be between about 10 microns and about 100 microns to minimize resistance to ionic transport. The particle size in case of dip coating with the slurry should range from between about 0.01 microns and 3 microns. If slurry or colloidal process is selected for deposition of both the intermediate layer and the dense electrolyte layer, the particle size in the slurry solution used to form the dense layer should be smaller than that of the second intermediate layer 12. The particle size ratio between layers should be in a range of between about 1.2 and about 10.

After green form 1 is produced, it can be coated with an LSCF cathode on the surface of dense electrolyte layer 14 using standard deposition procedures and the resultant green form can be further heated to sinter the ceramic materials making up the first layer 10, the second intermediate layer 12, the dense electrolyte layer 14, and the LSCF cathode. Preferably, the green form 1 is heated first to sinter the ceramic materials making up the first layer 10, the second intermediate layer 12, and the dense electrolyte layer 14, prior to deposition of the LSCF cathode. The resulting sintered form can then be coated with the LSCF cathode and fired at lower temperatures. Such separate heat treatments can result in formation of dense electrolyte layer 14 and a porous LSCF cathode.

Current collecting layers, commonly formed of silver or platinum, can be applied to the first layer 10 and the cathode by conventional techniques. Also, interconnect structures can also be formed to connect electrolytic cells incorporating green form structures of the present invention.

In the Examples discussed below, various electrolytic cells were prepared having an anode layer that would correspond to first layer 10, an intermediate layer that would correspond to second intermediate layer 12, and a dense electrolyte layer corresponding to dense electrolyte layer 14. The area specific resistance of each cell was evaluated at a temperature of 750° C. and a current density of 1 A/cm$^2$. As will become apparent from examples, the present invention allows very thin electrolyte layers to be produced, free of defects and that have a very low area specific resistance. The low resistance is very important in producing electrolytic cells having a low power consumption.

In all Examples, the anode layer was prepared by first mixing: 1) twelve and a half grams of $La_{0.6}Sr_{0.4}Co_{0.2}Fe_{0.8}O_{3-x}$ powder having particle sizes of from 30 to 70 µm; 2) thirty-seven and a half grams of LSCF powder having particle sizes less than 10 µm; 3) twelve and one-half gram of $Ce_{0.9}Gd_{0.1}O_{1.95}$ (CGO) powder having particle sizes of from 30 to 70 µm; 4) thirty-seven and a half grams of CGO powder having particle sizes less than 10 µm; and 5) seventeen and a half grams of graphite pore former having particle sizes less than 74 µm.

The mixing was accomplished by placing the foregoing ingredients in a plastic vial with a few methacrylate mixing malls. The vial was then inserted into a SPEX CERTIPREP Mixer/Mill and mixed for 10 minutes.

A polyurethane bag was placed over a mandrel of about 9.5 mm in diameter and the foregoing powder mixture was slowly poured into the bag to the desired volume as the bag and mandrel were vibrated. The bag was then capped and iso-statically pressed at 20 kpsi for 2 minutes. After iso-pressing, the bag was removed and the mandrel was withdrawn to produce a green tube.

EXAMPLE 1

Figure 2:
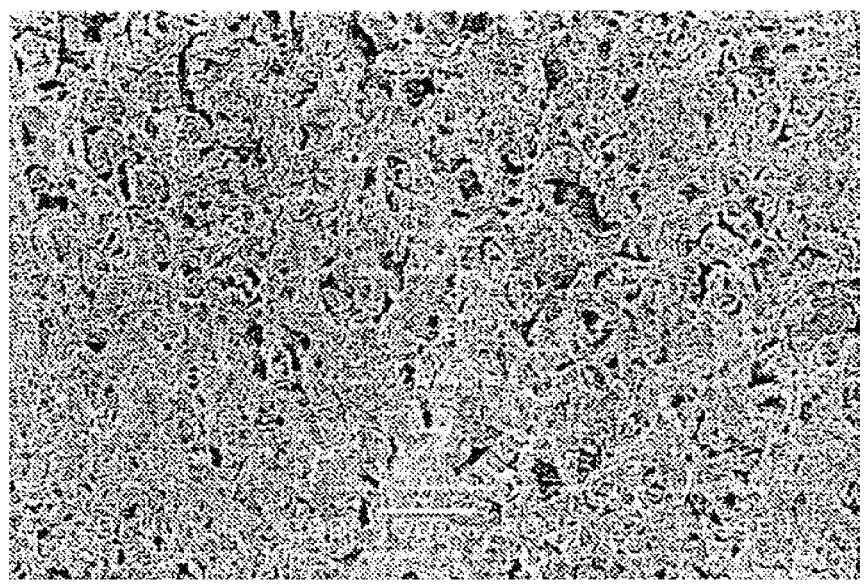
FIG. 2 is an SEM micrograph of a surface of a first layer of ceramic material to serve as an anode of an electrolytic cell to be constructed in accordance with the present invention.

In this Example, an electrochemical cell is manufactured in accordance with prior art techniques and as such has no intermediate layer. In this regard, a green tube, formed in the manner outlined above, was loaded into a furnace and heated 1° C. per minute under ambient air to 700° C. for 2 hours. The heating ramp was then increased to 2° C. per minute to 1300° C. for 4 hours. The furnace was cooled to room temperature at the rate of 2° C. per minute. The foregoing heat treatment removed pore forming material and organic binder and sintered the ceramic material. As illustrated in FIG. 2, the formed tube had a rough surface with large pores having a pore size of between about 20 and about 40 microns and small pores having a pore size of between about 3 and about 7 microns.

The ceramic tube was then plasma sprayed with a dense CGO electrolyte layer. It was found that in order to prevent any pinhole defects from occurring, a thickness about 100 µm was required for the dense CGO electrolyte layer. The composite tube was then coated with a porous LSCF cathode layer having a thickness of about 50 µm to form the electrochemical cell. After deposition of the LSCF cathode, the composite tube was then fired at 900° C. for two hours. The electrochemical cell was evaluated for performance at a current density of about 1 A/cm$^2$. At 750° C., an area specific resistance of about 1.5 Ωcm$^2$ was obtained.

EXAMPLE 2

In this Example, a composite cell was formed in accordance with the present invention.

A green tube was formed in the manner outlined above. The green tube was loaded into a furnace and heated at a rate of 1° C. per minute under ambient air to 700° C. for 2 hours. The heating ramp was then increased to 2° C. per minute to 950° C. for 4 hours. The furnace was cooled to room temperature at the rate of 2° C. per minute. The foregoing treatment removed the pore forming material and organic binder but did not sinter the ceramic.

A second intermediate layer was formed by dipping the treated tube a into a slurry solution containing CGO with an average particle size of 1.2 µm. After a few seconds had elapsed, the coated tube was removed from the slurry solution and allowed to dry and then subjected to a heat treatment to form pores. The coated tube was then loaded back into the furnace and heated 1° C. per minute under ambient air to 700° C. for 2 hours. The heating ramp was then increased to 2° C. per minute to 1050° C. for 4 hours. The furnace was cooled to room temperature at the rate of 2° C. per minute. The foregoing heat treatment produced pores but again, did not fully sinter the ceramic.

Figure 3:
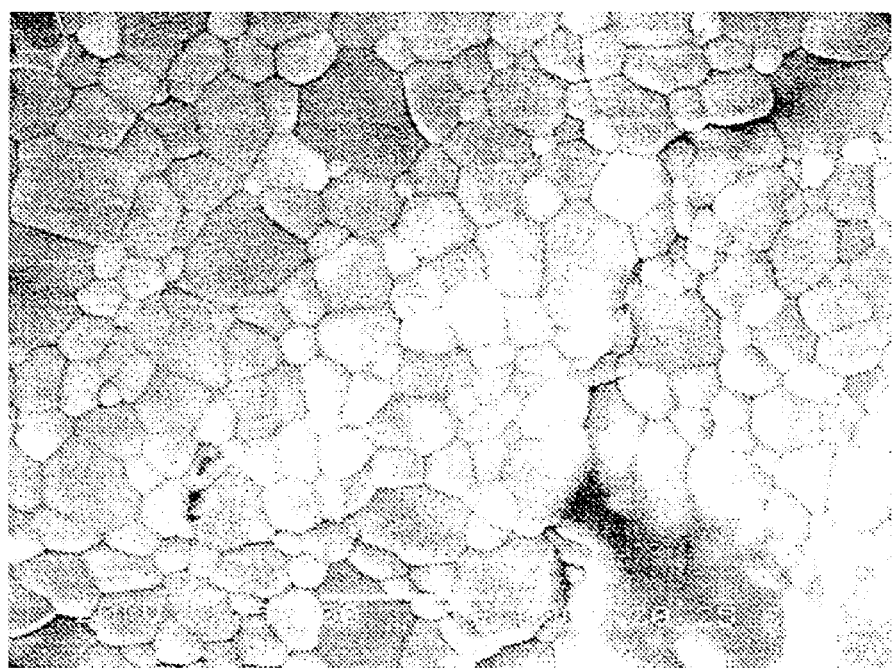
FIG. 3 is an SEM micrograph of a surface of a second intermediate layer applied to the anode layer, the surface of which is shown in FIG. 2.

After such heat treatment, the thickness of such second intermediate layer was found to be about 15 µm and the pores resulting therefrom had a pore size of less than about 1 µm. The surface of this layer is shown in FIG. 3. As is apparent, the surface of such second intermediate layer is much smoother than the surface shown in FIG. 2.

The second intermediate layer was plasma sprayed with a dense CGO electrolyte layer. It was found that such layer could be formed free of defect with a thickness of about 40 µm. The resulting composite tube was then heated at 2° C. per minute in ambient air at 1300° C. and sintered at this temperature for 4 hours. The furnace was then cooled to room temperature at the rate of 2° C. per minute.

The composite tube was then coated with a porous LSCF cathode layer of 50 µm and the resulting composite was heated to 900° C. for 2 hours to form an electrolytic cell. Such cell was evaluated for performance at a current density of 1 A/cm$^2$ and at 750° C., was found to have an area specific resistance of about 0.7 Ωcm$^2$.

EXAMPLE 3

A green tube prepared using the method described above was loaded into a furnace and heated 1° C. per minute under ambient air to 700° C. for 2 hours. The heating ramp was then increased to 2° C. per minute to 950° C. for 4 hours. The furnace was cooled to room temperature at the rate of 2° C. per minute. The foregoing process removed the graphite pore forming material and the organic binder but did not sinter the ceramic.

A second intermediate layer was applied by dipping the treated tube into a first slurry solution containing about 70% by weight CGO and about 30% by weight LSCF. The average particle size within the slurry solution was about 1.2 µm. After dipping, the coated tube was withdrawn from the solution, dried in air and subjected to a heat treatment. The heat treatment consisted of heating the coated tube in a furnace at 1° C. per minute in ambient air to 700° C. for 2 hours. This heat treatment formed pores within the second intermediate layer but did not sinter the ceramic. The thickness of such second intermediate layer was about 15 µm.

The treated tube was then dipped into second slurry solution containing CGO with an average particle size of 0.5 µm to form the dense electrolyte layer. The thickness of the dense CGO layer after such coating process was about 15 µm. The coated tube was then loaded back into the furnace and heated 1~2° C. per minute under ambient air to 1335° C. and sintered at this temperature for 4 hours. The furnace was cooled to room temperature at the rate of 2° C. per minute.

The composite tube so prepared was then coated with a porous LSCF cathode layer of 50 µm and heated to 900° C. for 2 hours to form an electrolytic cell. The cell was evaluated for performance at a current density of 1 A/cm$^2$. At 750° C., it was found to have an area specific resistance of about 0.25 Ωcm$^2$.

While the present invention has been discussed with reference to a preferred embodiment, as will occur to those skilled in the art, numerous changes, additions and omissions can be made without departing from the spirit and scope of the present invention.

We claim:

1. A method of producing a green form for use in manufacturing a composite, ceramic ion transport membrane, said method comprising:

forming a first layer from a first ceramic powder mixture having coarse particles in a coarse particle size range of between about 30 microns and about 150 microns and the fine particles having a fine particle size of no greater than about 15 microns, said first layer being used to form the anode of an electrolytic cell;

forming a second intermediate layer on said first layer from a second ceramic powder mixture having a second particle size in a second particle size range of between about 0.1 microns and about 5 microns, said second intermediate layer being thinner than said first layer;

the first ceramic powder mixture and the second ceramic powder mixture having a binder and at least the first ceramic powder mixture also having a pore forming material;

the second ceramic powder mixture formed at least in part by material used in forming a dense layer and having a particle size less than that of particles of said first ceramic powder mixture to decrease surface roughness and to allow formation of pores in the second layer of smaller size than those of the first layer;

heating the first and the second intermediate layer to remove the binder and pore forming material and to form the pores in the first and the second intermediate layer while not sintering the first layer and the second intermediate layer;

after heating, the pores of said first layer are large pores having a large size range of between about 20 microns and about 100 microns end small pores having a small size range of between about 1 micron and about 10 microns and a porosity is produced of between about 20 percent and about 45 percent and said second intermediate layer has second intermediate layer pores no greater than about 5 microns and a second intermediate layer porosity of no greater than about 45%; and forming a layer of dense layer material, on said at least one second intermediate layer after the removal of the binder and the formation of the pores front the first layer and the second intermediate layer, the dense layer material containing dense layer particles capable of conducting ions and forming an electrolyte layer of the electrolytic cell, the first layer, the at least one second intermediate layer and the layer of dense layer material all not being sintered during production of the green form.

2. The method of claim 1, wherein said first and the second intermediate layer are heated separately.

3. The method of claim 1 or claim 2, wherein said second intermediate layer is formed on the first layer by dip coating and said layer of dense layer material is formed on said at least one second intermediate layer by dip coating.

4. The method of claim 1, wherein said layer of dense layer material is formed on said at least one second intermediate layer by thermal spraying.

5. The method of claim 1 wherein the dense layer particles have a dense layer particle size of between about 0.01 and 3 microns and wherein a ratio of particle sizes between those of the second intermediate layer and the dense layer material is between about 1.2 and about 10.

6. The method of claim 1, wherein:

said first ceramic powder mixture comprises between about 10 percent and about 90 percent gadolinium doped ceria, remainder strontium doped lanthanum cobalt iron oxide;

said electrolyte layer is formed of gadolinium doped ceria; and the second ceramic powder mixture comprises strontium doped lanthanum cobalt iron oxide and gadolinium doped ceria and has more gadolinium doped ceria than said first ceramic powder mixture and less strontium doped lanthanum cobalt iron oxide than said first ceramic powder mixture.

7. The method of claim 6, wherein:

said ceramic form is of tubular configuration;

said first layer has a first layer wall thickness of between about 0.5 mm and about 3.5 mm;

said second intermediate layer has a second intermediate layer wall thickness of no greater than about 30 microns; and said electrolyte layer has an electrolyte layer thickness of between about 10 microns and about 100 microns.

* * * * *